(12) United States Patent
Withers, Jr. et al.

(10) Patent No.: US 7,778,607 B2
(45) Date of Patent: Aug. 17, 2010

(54) ECHO MIMO: A METHOD FOR OPTIMAL MULTIPLE INPUT MULTIPLE OUTPUT CHANNEL ESTIMATION AND MATCHED COOPERATIVE BEAMFORMING

(75) Inventors: Langhorne P. Withers, Jr., Springfield, VA (US); Robert M. Taylor, Sterling, VA (US)

(73) Assignee: The MITRE Corporation, McLean, VA (US)

( * ) Notice: Subject to any disclaimer, the term of this patent is extended or adjusted under 35 U.S.C. 154(b) by 745 days.

(21) Appl. No.: 11/262,479

(22) Filed: Oct. 31, 2005

(65) Prior Publication Data
US 2007/0099571 A1 May 3, 2007

(51) Int. Cl.
*H04B 17/00* (2006.01)
(52) U.S. Cl. .................................... 455/67.11; 455/500
(58) Field of Classification Search .............. 455/67.11, 455/500, 67.12, 67.14, 550.1
See application file for complete search history.

(56) References Cited

U.S. PATENT DOCUMENTS

| | | | | |
|---|---|---|---|---|
| 6,113,545 | A * | 9/2000 | Chiao et al. ................. 600/447 |
| 2002/0034161 | A1 * | 3/2002 | Deneire et al. .............. 370/210 |
| 2003/0162567 | A1 * | 8/2003 | Raghothaman et al. ...... 455/562 |
| 2004/0087324 | A1 * | 5/2004 | Ketchum et al. ............ 455/513 |
| 2004/0192218 | A1 * | 9/2004 | Oprea ........................ 455/73 |
| 2004/0234004 | A1 * | 11/2004 | Ketchum et al. ............ 375/267 |
| 2005/0107057 | A1 * | 5/2005 | Sun ............................ 455/272 |
| 2005/0141540 | A1 * | 6/2005 | Li et al. ...................... 370/437 |
| 2005/0176375 | A1 * | 8/2005 | Bednasz et al. ........... 455/67.12 |
| 2005/0265275 | A1 * | 12/2005 | Howard et al. .............. 370/328 |
| 2006/0025079 | A1 * | 2/2006 | Sutskover et al. ......... 455/67.11 |
| 2006/0171297 | A1 * | 8/2006 | Ghosh ........................ 370/210 |
| 2006/0203794 | A1 * | 9/2006 | Sampath et al. ............ 370/344 |
| 2006/0270415 | A1 * | 11/2006 | Waxman ................. 455/452.2 |
| 2006/0281421 | A1 * | 12/2006 | Pan et al. ................... 455/126 |
| 2006/0284725 | A1 * | 12/2006 | Naguib et al. ............. 340/7.39 |
| 2006/0286982 | A1 * | 12/2006 | Prakash et al. ........... 455/435.1 |
| 2007/0049347 | A1 * | 3/2007 | Jin et al. .................. 455/562.1 |

(Continued)

OTHER PUBLICATIONS

H. Pham, T. Taniguchi, and Y. Karasawa, "MIMO Beamforming for High-Bit-Rate Transmission over Frequency-Selective Fading Channels," Aug. 30-Sep. 2, 2004, Spread Spectrum Techniques and Applications, 2004 IEEE Eighth International Symposium, pp. 275-279.*

(Continued)

*Primary Examiner*—Matthew D Anderson
*Assistant Examiner*—Erica Fleming-Hall
(74) *Attorney, Agent, or Firm*—Sterne Kessler Goldstein & Fox, P.L.L.C.

(57) ABSTRACT

A method for estimating a communication channel comprising one or more sub-channels between at least a first transceiver and at least a second transceiver is provided. The method comprises transmitting a first set of training data from the first transceiver to the second transceiver, receiving observed signals at the second transceiver, re-transmitting said observed signal back to the first transceiver, and calculating a roundtrip channel estimate at the first transceiver. The method further comprises transmitting a second set of training data from the second transceiver to the first transceiver, receiving observed signals at the first transceiver, and calculating a reverse link channel estimate. From the roundtrip channel estimate and the reverse link channel estimate, a forward link channel estimate is computed at the first transceiver.

24 Claims, 13 Drawing Sheets

U.S. PATENT DOCUMENTS

| | | | |
|---|---|---|---|
| 2007/0072552 A1* | 3/2007 | Jonsson et al. | 455/67.11 |
| 2007/0097856 A1* | 5/2007 | Wang et al. | 370/210 |
| 2007/0115909 A1* | 5/2007 | Wang et al. | 370/342 |
| 2007/0281624 A1* | 12/2007 | Thomas et al. | 455/67.11 |
| 2008/0010434 A1* | 1/2008 | Jitsukawa et al. | 712/1 |

OTHER PUBLICATIONS

G. Foshini, "Layered space-time architecture for wireless communication in a fading environment when using multi-element antennas," *Bell Labs Tech. J.*, 41-59, Autumn, 1996.

S. Alamouti, "A simple transmit diversity technique for wireless communications," *IEEE Sel.Areas Comm.* 16(8), Oct. 1998.

J.C. Guey and L.D. Larsson, "Modeling and evaluation of MIMO systems exploiting channel reciprocity in TDD mode," IEEE Vehicular Technology Conference, 6, 4265-4269, Sep. 2004.

A. Narula, M. Trott, G. Wornell, "Performance limits of coded diversity methods for transmitter antenna arrays," *IEEE Trans. Information Theory*, 45(7), Nov. 1999.

D. Love, R. Heath, T. Strohmer, "Grassmannian beamforming for multiple-input multiple output wireless systems," *IEEE Trans. Information Theory*, 49(10), Oct. 2003.

K. Mukkavilli, A. Sabharwal, E. Erkip, B. Aazhang, "On beamforming with finite rate feedback in multiple-antenna systems," *IEEE Trans. Information Theory*, 49(10), Oct. 2003.

B.C. Ng, M. Cedervall, A. Paulraj, "A structured channel estimator for maximum-likelihood sequence detection," *IEEE Communications Letters*, 1(2), Mar. 1997.

P. Stoica, M. Viberg, "Maximum likelihood parameter and rank estimation in reduced-rank multivariate linear regressions," *IEEE Trans. Signal Processing*, 44(12), Dec. 1996.

Y. Hua, M. Nikpour, P. Stoica, "Optimal reduced-rank estimation and filtering," *IEEE Trans. Signal Processing*, 49(3), Mar. 2001.

T. Gustafsson, B. Rao, "Statistical analysis of subspace-based estimation of reduced-rank linear regressions," *IEEE Trans. Signal Processing*, 50(1), Jan. 2002.

J. Manton, R. Mahony, Y. Hua "The geometry of weighted low-rank approximations," *IEEE Trans. Signal Processing*, 51(2), Feb. 2003.

K. Werner, M. Jansson, "Weighted low rank approximation and reduced rank linear regression," *Proc. ICASSP '04*, I-501-II-504 2, May 2004.

M. Médard, "The effect upon channel capacity in wireless communications of perfect and imperfect knowledge of the channel," *IEEE Trans. Information Theory*, vol. 46, No. 3, May 2000.

* cited by examiner

ECHO MIMO: A METHOD FOR OPTIMAL MULTIPLE INPUT MULTIPLE OUTPUT CHANNEL ESTIMATION AND MATCHED COOPERATIVE BEAMFORMING

FIELD OF THE INVENTION

The present invention relates generally to data communication. More particularly, the invention relates to a method for multiple input multiple output (MIMO) channel estimation and optimal channel exploitation in wireless communication systems.

BACKGROUND OF THE INVENTION

Multiple input multiple output (MIMO) communication systems, using multiple transmit and receive antennas, have become an important technology area in recent years. MIMO systems provide improved performance compared to single input single output (SISO) systems in the presence of multipath fading which characterize nearly all wireless communication channels.

In theory, using multiple transmit and receive antennas, transmit array gain can be achieved in addition to spatial diversity gain and receive array gain if the MIMO system operates in a closed-loop mode. Closed-loop MIMO allows for optimal transmit/receive beamforming. The beamforming may be done over any number of spatial modes of the channel. If beamforming is done over only the dominant mode of the channel, we call the corresponding beamforming vectors maximum ratio transmission (MRT) and maximum ratio combining (MRC) vectors for the transmit and receive sides, respectively. If beamforming is done over more than one spatial mode of the channel, it is referred to as linear pre-filtering or modal decomposition. Generally, a waterpouring algorithm is used in conjunction with modal decomposition algorithms. The term beamforming vectors will be used in association with MRT/MRC, while the term beamforming matrices will be used in association with modal decomposition.

In practice, approaching optimal transmit/receive beamforming over a communication channel is a function of the available knowledge of and accuracy of channel state information (CSI) at both ends (transmit and receive sides) of the channel. Channel estimation is concerned with estimating CSI. Accordingly, approaching optimal beamforming becomes a function of the quality of estimation schemes employed to estimate the communication channel. Known channel estimation techniques are typically partial CSI schemes. In other words, the feedback information from the receiver to the transmitter does not provide full knowledge of the transmission channel to the transmitter. Hence, partial CSI methods are insufficient for achieving optimal transmit/receive beamforming.

What is needed, therefore, are efficient techniques for achieving full CSI channel estimation that allow close to optimal transmit/receive beamforming.

BRIEF SUMMARY OF THE INVENTION

In one aspect of the invention, a method for estimating a communication channel comprising one or more sub-channels between at least a first transceiver and at least a second transceiver is provided. In an embodiment, the method comprises transmitting a first set of training signals forward, from the first transceiver to the second transceiver, receiving first observed signals produced from the transmitted first set of signals at the second transceiver, estimating a forward link channel at the second transceiver, and re-transmitting said first observed signals back to the first transceiver. Upon receiving the re-transmitted first observed signals at the first transceiver, the method further comprises calculating a roundtrip channel estimate at the first transceiver. The method further comprises transmitting a second set of training signals from the second transceiver to the first transceiver, receiving second observed signals produced from the transmitted second set of signals at the first transceiver, and calculating at the first transceiver a reverse link channel estimate based on the received second observed signals. A forward link channel estimate is then calculated, at the first transceiver, from the calculated roundtrip channel estimate and the calculated reverse link channel estimate.

In another aspect, a method for estimating a quasi-symmetric communication channel comprising one or more sub-channels between at least a first transceiver and at least a second transceiver is provided. In an embodiment, the method comprises transmitting a first set of training data from the first transceiver to the second transceiver, receiving observed signals produced from the first set of training data at the second transceiver, and re-transmitting said observed signals back to the first transceiver. Upon receiving the re-transmitted observed signals at the first transceiver, the method further comprises calculating at the first transceiver a roundtrip channel estimate and computing transmit beamformer weights based on the calculated roundtrip channel estimate and by the quasi-symmetry condition.

In a further aspect of the present invention, a method of channel estimation to reduce the effect of symbol timing synchronization errors is provided. In an embodiment, the method comprises receiving a Nyquist pulse-shaped training signal, sampling a pulse of said signal according to a sampling rate higher than a symbol rate of said pulse to generate a plurality of samples, and estimating a symbol comprised in said pulse based on the plurality of samples Embodiments of the present invention provided herein may be used in a plurality of communication systems including, for example, single-input single-output (SISO) systems, single-input multiple-output (SIMO) systems, multiple-input single output (MISO) systems, and multiple-input multiple-output (MIMO) systems. Further, embodiments of the present invention may be used in various types of communication systems including, for example, electromagnetic (wireless) communication systems, acoustic communication systems, and underwater acoustic communication systems.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

Complete Closed-Loop Multiple-Input Multiple-Output (MIMO) Beamforming Communication System Embodiments of the present invention provided herein may be used in a plurality of communication systems including, for example, single-input single-output (SISO) systems, single-input multiple-output (SIMO) systems, multiple-input single output (MISO) systems, and multiple-input multiple-output (MIMO) systems. For purposes of illustration only, embodiments of the present invention will be described with respect to MIMO systems. Further, embodiments of the present invention may be used in various types of communication systems including, for example, electromagnetic (wireless) communication systems, acoustic communication systems, and underwater acoustic communication systems. Certain embodiments of the present invention will be described with respect to wireless communication systems. A person skilled in the art(s) will appreciate, however, based on the teachings provided herein that the same embodiments may similarly be applied in other types of communication systems.

Figure 1:
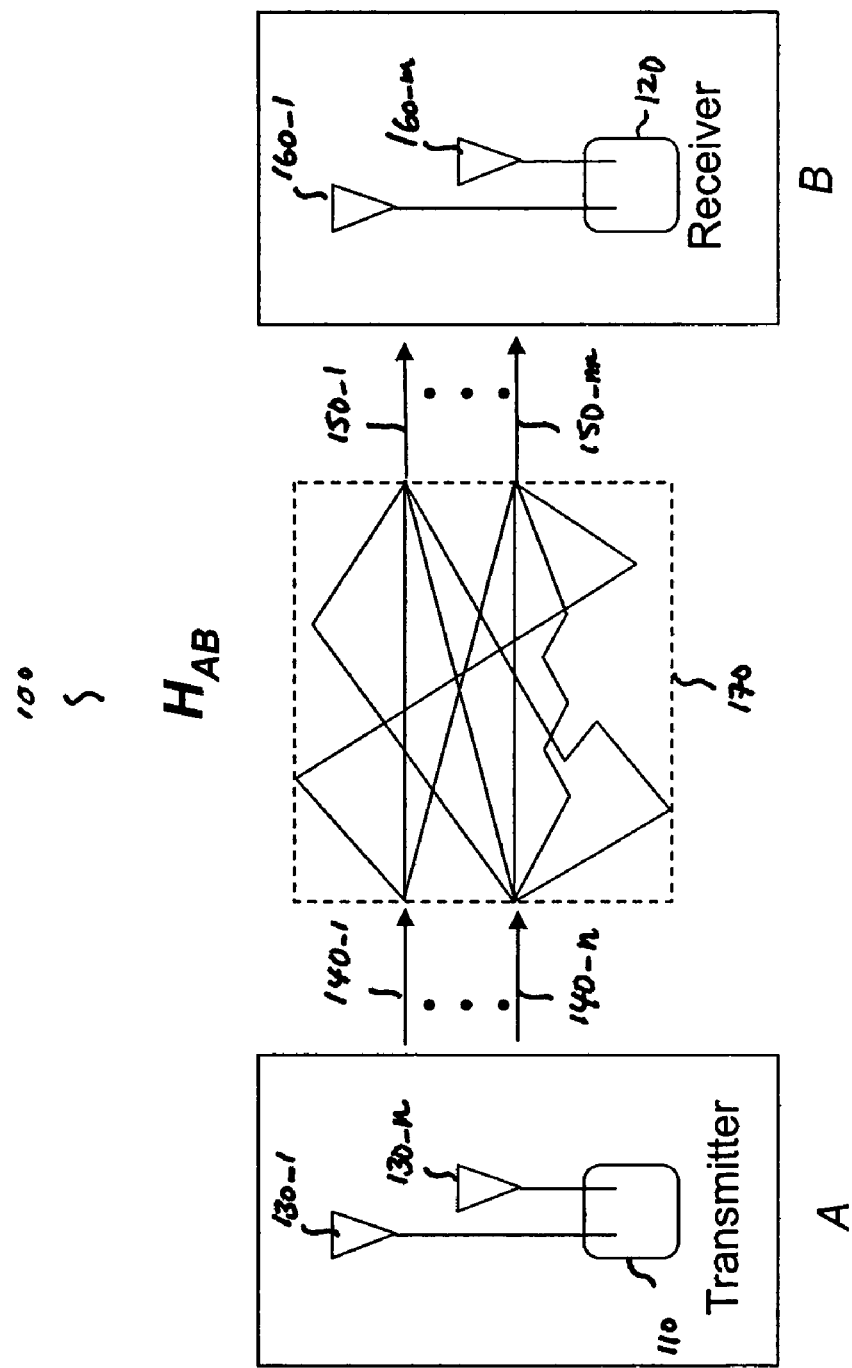
FIG. 1 is a diagram that illustrates an example of a typical multiple-input multiple-output (MIMO) communication system showing a forward link from a transmitter at point A to a receiver at point B.

FIG. 1 is a diagram that illustrates an example of a typical multiple-input multiple-output (MIMO) communication system 100. In the example of FIG. 1, communication system 100 includes transceiver systems A and B and a communication channel 170. Transceiver system A includes a transmitter 110. Transceiver system B includes a receiver 120. Transmitter 110 employs multiple transmit antennas 130-$\{1, \ldots, n\}$. Receiver 120 employs multiple receive antennas 160-$\{1, \ldots, m\}$. The number of transmit antennas (n) at transmitter 110 may or may not be equal to the number of receive antennas (m) at receiver 120.

Referring to FIG. 1, communication channel 170 represents a MIMO channel. Accordingly, communication channel 170 includes multiple spatial sub-channels formed between the multiple transmit antennas 130-$\{1, \ldots, n\}$ and the multiple receive antennas 160-$\{1, \ldots, m\}$.

Typically, the number of spatial sub-channels comprised in a MIMO communication channel is related to a channel matrix H of the communication channel. The channel matrix H is generally of the form:

$$H = \begin{bmatrix} h_{1,1} & h_{1,2} & \cdots & h_{1,n} \\ h_{2,1} & h_{2,2} & \cdots & h_{2,n} \\ \vdots & \vdots & \vdots & \vdots \\ h_{m,1} & h_{m,2} & \cdots & h_{m,n} \end{bmatrix} \quad (1)$$

where $h_{ij}$ represents a complex gain of the spatial sub-channel between the j-th transmit antenna and the i-th receive antenna. The complex gain specifies an amplitude attenuation factor and a phase shift associated with the spatial sub-channel.

In general, spatial sub-channels of a MIMO communication channel experience different channel conditions such as fading and multipath effects, for example. Further, channel conditions of the spatial sub-channels may vary with time. Accordingly, a channel matrix of the channel also varies with time, and is typically only considered to remain constant over a coherence time parameter of the channel.

Referring to the example of FIG. 1, $H_{AB}$ represents the channel matrix from transceiver A to transceiver B of communication channel 170. Communication channel 170 may also have associated with it a channel matrix $H_{BA}$ that describes the reverse channel from transceiver B to transceiver A. Typically, communication channels are not symmetric, and thus $H_{AB}$ and $H_{BA}$ may or may not be identical.

Still referring to FIG. 1, signals 140-$\{1, \ldots, n\}$ represent transmitted signals by respective transmit antennas 130-$\{1, \ldots, n\}$ of transceiver A. Signals 140-$\{1, \ldots, n\}$ may be transmitted with equal or different transmit power levels. As illustrated in FIG. 1, transmitted signals 140-$\{1, \ldots, n\}$ propagate in different propagation paths from A to B, and thus experience different channel effects. At B, transmitted signals 140-$\{1, \ldots, n\}$ recombine to generate received signals 150-$\{1, \ldots, m\}$ at respective receive antennas 160-$\{1, \ldots, m\}$. Received signals 150-$\{1, \ldots, m\}$ may be received at equal or different power levels. Further, received signals 150-$\{1, \ldots, m\}$ may be received at equal or different instants of time.

Figure 2A:
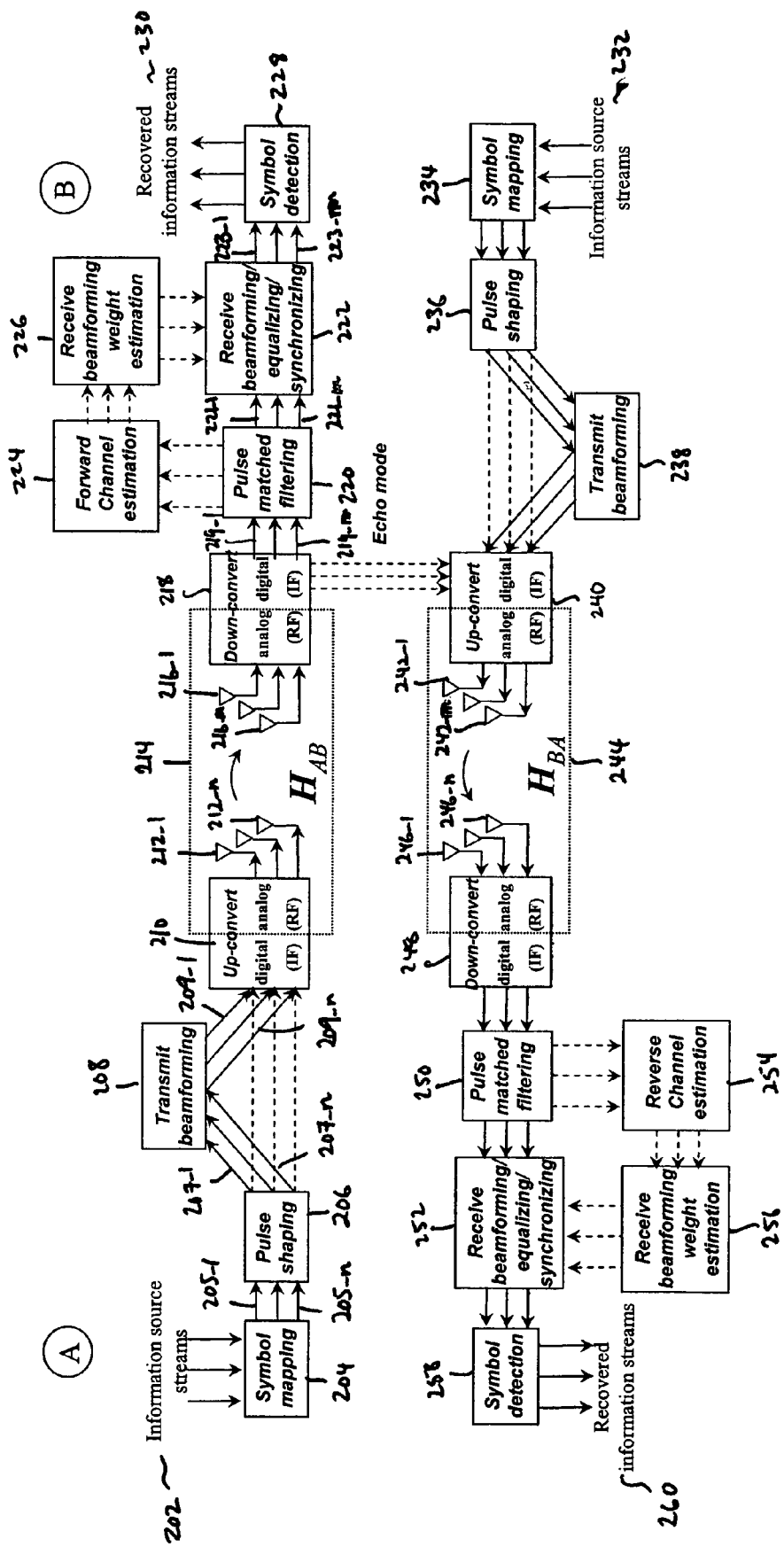
FIG. 2A is a block diagram that illustrates an exemplary transmit-receive chain between two transceiver systems in a MIMO communication system.

FIG. 2A is a block diagram that illustrates an exemplary transmit-receive chain between two transceiver systems A and B in a MIMO communication system 200. The example of FIG. 2A depicts post-channel estimation communication between A and B. In other words, it is assumed that forward and reverse channels $H_{AB}$ 214 and $H_{BA}$ 244 have already been estimated, and that the communicated signals are information signals.

In the example of FIG. 2A, transceivers A and B each includes transmitter and receiver components. The components of transceivers A and B illustrated in the example of FIG. 2A represent some of the high-level components in a typical MIMO transceiver system. For ease of illustration, other components may have been omitted. Communication between transceivers A and B in the example of FIG. 2A is illustrated by the solid line arrows. Dashed line arrows represent possible paths in the transmit-receive chain that do not occur in the illustrated example.

Referring to FIG. 2A, at transceiver A, information source streams 202 are passed to a symbol mapping component 204. In an embodiment, information source streams 202 include one or more separate data streams. Symbol mapping component 204 modulates the received information source streams 202 based on one or more modulation schemes to generate one or more modulated streams 205-$\{1, \ldots, n\}$, one modulated stream for each spatial sub-channel of the MIMO system. Modulated streams are then pulse-shaped using pulse shaping component 206 to generate one or more pulse-shaped information streams 207-$\{1, \ldots, n\}$. In an embodiment, streams 207-$\{1, \ldots, n\}$ are shaped using a raised-cosine pulse shaping filter.

Still referring to FIG. 2A, the pulse-shaped information streams 207-$\{1, \ldots, n\}$ are next input into a transmit beamforming component 208. Transmit beamforming component 208 processes the pulse-shaped information streams 207-$\{1, \ldots, n\}$ to generate one or more beamformed information streams 209-$\{1, \ldots, n\}$. In an embodiment, transmit beamforming component 208 applies amplitude and phase changes to the one or more pulse-shaped information streams 207-$\{1, \ldots, n\}$. In an embodiment, the transmit beamforming component 208 processes the one or more pulse shaped information streams 207-$\{1, \ldots, n\}$ according to a transmit beamforming vector or matrix that specifies a complex transmit gain weight for each of the one or more pulse-shaped streams.

Still referring to FIG. 2A, in an embodiment for RF communications, the beamformed information streams 209-$\{1, \ldots, n\}$ are input into an upconversion component 210 which includes both digital upconversion and analog upconversion components. Within up-conversion component 210, a digital upconverter upconverts baseband signals 209-$\{1, \ldots, n\}$ to an intermediate frequency (IF). The signals are then passed through a digital-to-analog (D/A) converter, prior to frequency up-conversion to radio frequency (RF). The RF upconverted beamformed streams are provided to one or more transmit antennas 212-$\{1, \ldots, n\}$ of transceiver A. Transmit antennas 212-$\{1, \ldots, n\}$ transmit the up-converted information streams over forward communication channel $H_{AB}$ 214.

At transceiver B, the transmitted information streams from A are received at receive antennas 216-$\{1, \ldots, m\}$. In an embodiment for RF systems, down conversion component 218 of transceiver B performs analog down-conversion of the received signals to intermediate frequency (IF), samples the IF signals, and then digitally downconverts the IF sampled signals to create complex-valued baseband signals 219-$\{1, \ldots m\}$. Baseband signals 219-$\{1, \ldots, m\}$ are then fed to a pulse matched filtering component 220. Pulse matched filtering component 220 filters streams 219-$\{1, \ldots, m\}$ using a filter matched to the transmitted signals' pulse shape to generate filtered streams 221-$\{1, \ldots, m\}$. Receive beamforming is then applied to filtered streams 221-$\{1, \ldots, m\}$ using receive beamforming component 222, which applies complex receive gain weights to the one or more filtered information streams 221-$\{1, \ldots, m\}$ according a receive beamforming vector or matrix. In an embodiment, the receive beamforming vector or matrix is matched to the transmit beamforming vector or matrix used at transceiver A. In the "matching" process, the training sequences are beamformed in such a way as to allow the receiver to directly estimate the receive beamforming vector or matrix without having to first estimate the channel matrix. Receive beamformed streams 223-$\{1, \ldots, m\}$ are then input into a symbol detection component 228, which decodes the beamformed streams to recover one or more information streams 230.

It is noted that components 224 and 226 are provided but not described with reference to FIG. 2A, which describes only the information transmission stage. Components 224 and 226 are used during the training stage. Components 224 and 226 are further described below.

The transmit-receive process on the reverse channel from B to A is identical to the transmit-receive process from A to B described above. Accordingly, components 234-242 and 246-258 in FIG. 2A correspond, respectively, to components 204-212 and 216-228 described above.

Echo MIMO Channel Estimation: Providing CSI at Transmitter and Receiver

In a MIMO communication system, optimal communication between a transmitter and a receiver requires optimal transmit and receive complex beamforming weights, at both the transmitter and receiver. Various criteria for optimality of the communication link may be desired, such as maximum gain, minimum symbol-error rate, minimum outage probability, maximum capacity, maximum information capacity, or maximum signal-to-interference-plus noise ratio. Approaching these optimal allocations beamforming parameter settings, however, typically requires sufficient channel state information (CSI). The transmitter must possess knowledge of its outgoing channel characteristics, and in some communication schemes, the receiver must also possess knowledge of the same channel characteristics, which describe its incoming channel. Channel estimation, therefore, is a prerequisite for optimally utilizing the available transmit and receive powers in a MIMO communication system. A MIMO channel estimation method according to an embodiment of the present invention will now be provided.

Figure 3:
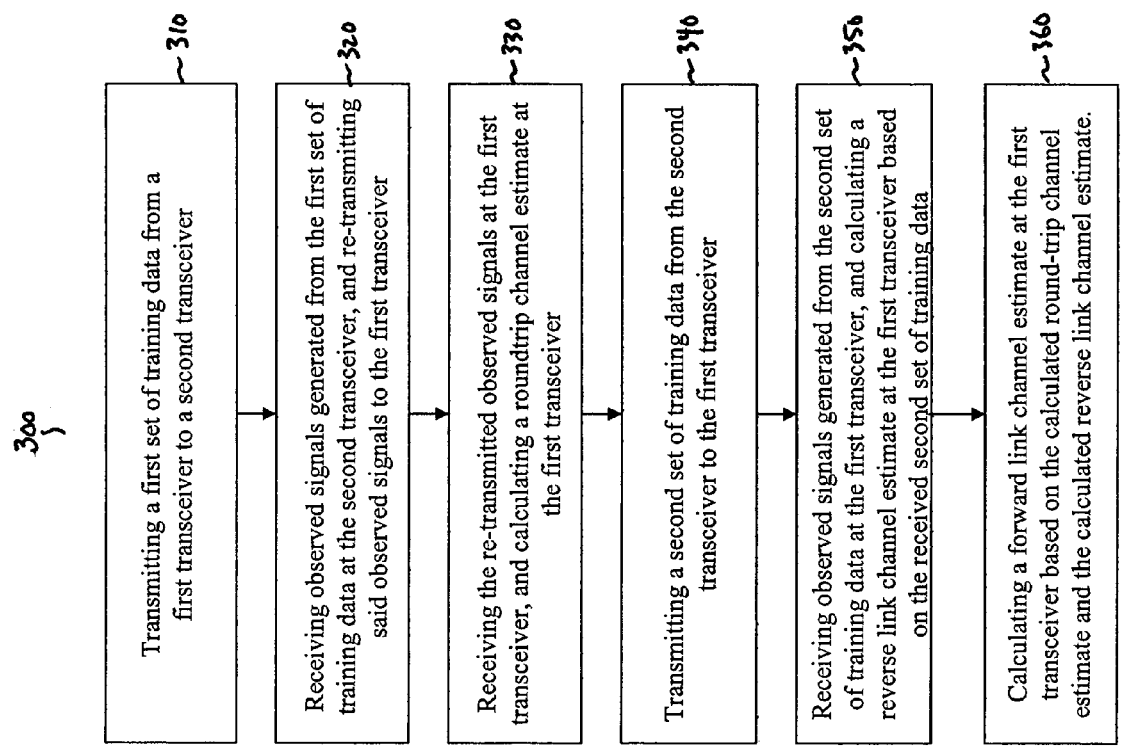
FIG. 3 is a process flowchart for channel estimation according to an embodiment of the present invention.

FIG. 3 is a process flowchart 300 for estimating a communication channel according to an embodiment of the present invention. In the embodiment, the communication channel includes one or more sub-channels between at least a first transceiver and at least a second transceiver.

Process flowchart 300 begins in step 310, which includes transmitting a first set of training data from the first transceiver to the second transceiver. In an embodiment, the first training data is a data sequence known both at the first and second transceivers.

Step 320 includes receiving observed signals from the first set of training data at the second transceiver, and then re-transmitting the received observed signals to the first transceiver. The second transceiver is said to "echo" the observed signals. In an embodiment, the second transceiver echoes the observed signals by directly feeding the observed signals to the input of the transmit RF amplifier. In another embodiment, the second transceiver echoes the observed signals at the IF level by sampling, storing in memory, and then passing out the D/A of the transmitter.

Step 330 includes receiving, at the first transceiver, the re-transmitted observed signals produced from the first set of training data, and calculating a roundtrip channel estimate at the first transceiver. The roundtrip channel estimate is representative of channel conditions of the roundtrip communication channel consisting of the communication path from the first transceiver to the second transceiver and back. The roundtrip communication channel includes one or more sub-channels between the first and the second transceivers. In an embodiment, the roundtrip channel estimate includes a complex gain value for each sub-channel comprised in the roundtrip communication channel.

Figure 2B:
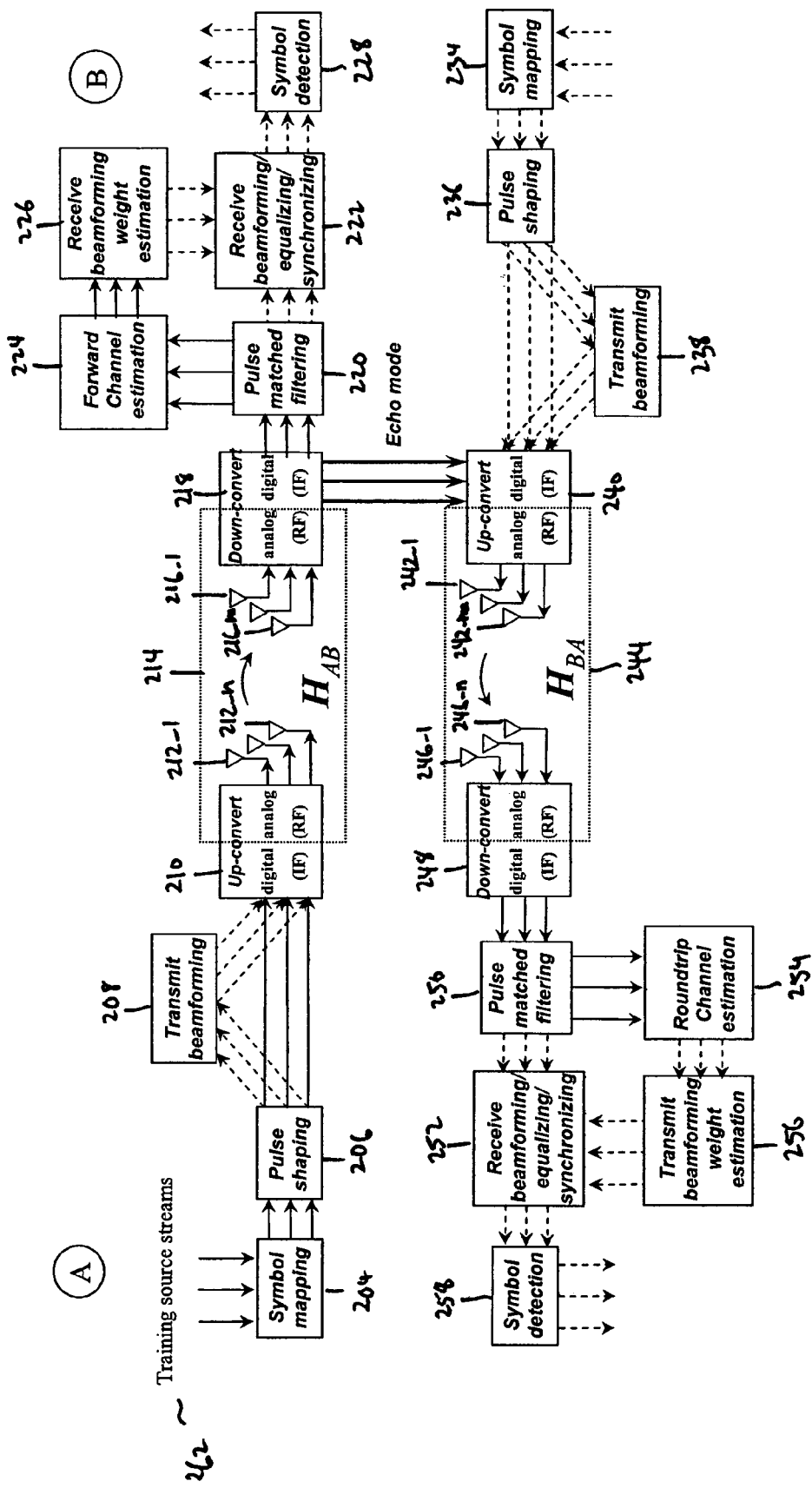
FIG. 2B is a block diagram that illustrates an implementation of a first step of a MIMO channel estimation method according to an embodiment of the present invention.

FIG. 2B is a block diagram that illustrates steps 310, 320, and 330 of process flowchart 300 implemented in the exemplary MIMO communication system 200 of FIG. 2A.

Step 310 is achieved, in FIG. 2B, by training source streams 262 being symbol mapped, pulse shaped, and up-converted, before being transmitted by transmit antennas 212-1 $\{1, \ldots, n\}$ over communication channel $H_{AB}$ 214.

Step 320 is achieved, in the example of FIG. 2B, by transceiver B receiving the transmitted signals using receive antennas 216-$\{1, \ldots, m\}$, down-converting the received signals, and sending the received observed signals from receive down-conversion component 218 to the transmit up-conversion component 240. In an embodiment, the received signals are down-converted to IF frequency before being fed from the receive side to the transmit side. In another embodiment, the received signals are transferred from receive down-conversion component 218 to transmit up-conversion component 240 before RF down-conversion. Step 320 further includes the observed signals being re-transmitted by transmit antennas 242-$\{1 \ldots, m\}$ of transceiver B over communication channel $H_{BA}$ 244.

Step 330 is achieved, in the example of FIG. 2B, by receiving the re-transmitted observed signals by receive antennas 246-$\{1, \ldots, n\}$ of transceiver A, down-converting (using down-conversion component 248) and pulse-match filtering (using pulse matched filtering component 250) the received signals, before calculating a roundtrip channel estimate using roundtrip channel estimation component 254 of transceiver A. The roundtrip channel estimate calculated at A describes the channel from A to B and then back to A.

Referring back to FIG. 3, step 340 includes transmitting a second set of training data from the second transceiver to the first transceiver. In an embodiment, the second set of training data is known both at the first and second transceivers.

Step 350 includes receiving observed signals produced from the second training set at the first transceiver, and calculating a reverse link channel estimate at the first transceiver based on the received observed signals. The reverse link channel estimate is representative of channel conditions of the communication channel from the second transceiver to the first transceiver. The reverse link communication channel includes one or more sub-channels between the first and second transceivers. In an embodiment, the channel estimate includes a complex gain value for each sub-channel comprised in the reverse link communication channel.

Step 360 includes calculating a forward link channel estimate at the first transceiver based on the calculated first round-trip channel estimate (calculated in step 330) and the calculated reverse link channel estimate (calculated in step 350). In an embodiment, the first transceiver calculates the forward link channel estimate using the calculated round-trip channel estimate and the calculated reverse link channel estimate jointly minimizing a weighted least square error criterion.

Figure 2C:
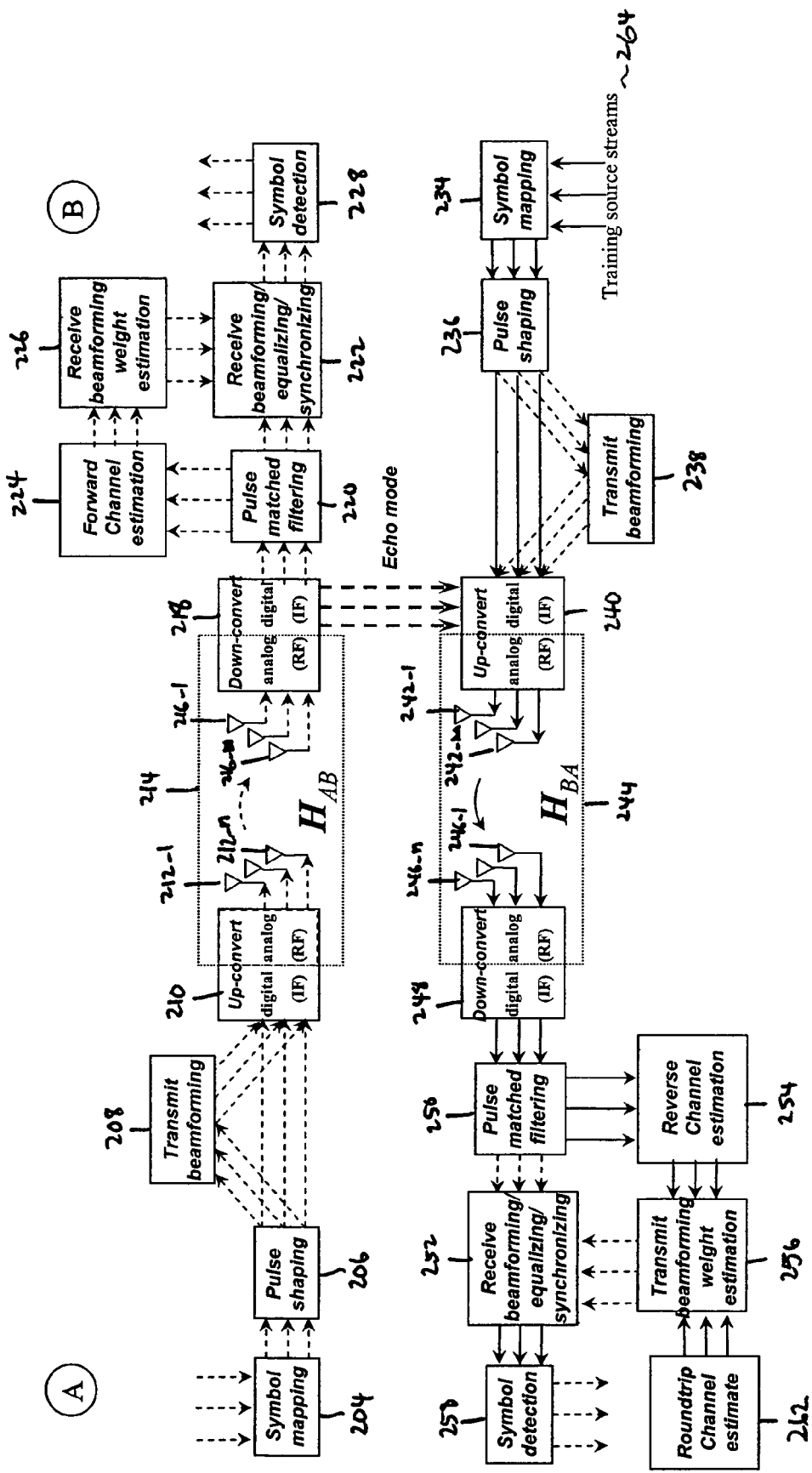
FIG. 2C is a block diagram that illustrates an implementation of a step of a MIMO channel estimation method according to an embodiment of the present invention.

FIG. 2C is a block diagram that illustrates steps 340, 350, and 360 of process flowchart 300 implemented in the exemplary MIMO communication system 200 of FIG. 2A.

Step 340 is achieved, in the example of FIG. 2C, by training source streams 264 being symbol mapped, pulse shaped, and RF up-converted, before being transmitted by transmit antennas 242-$\{1, \ldots, m\}$ of transceiver B over communication channel $H_{BA}$ 244.

Step 350 is achieved, in the example of FIG. 2C, by transceiver A receiving the transmitted signals using receive antennas 246-$\{1, \ldots, n\}$, RF down-converting and pulse match filtering the received signals, before calculating a reverse link channel estimate using reverse channel estimation component 254. Further, step 360 is achieved by using reverse link channel estimation component 254 with round trip channel estimation component 262 of transceiver A to calculate a forward link channel estimate at transceiver A. Also, using transmit beamforming weight estimation component 256 and the calculated forward link channel estimate, transceiver A may calculate transmit beamforming weights based on the forward link channel estimate.

Full-duplex (two-way) channel estimation can also be achieved according to the channel estimation process depicted in the process flowchart of FIG. 3 by swapping transceivers A and B and repeating the process described above.

Full-duplex channel estimation according to embodiments of the present invention can be achieved using various schemes. In embodiments, full-duplex channel estimation between the first and second transceivers is achieved according to a time-division-duplexing (TDD) scheme. In such embodiments, channel estimation is done in one direction at a time using a single frequency communication band between the first and second transceivers. In other embodiments, frequency-division-duplexing (FDD) schemes can be used. In such embodiments, channel estimation is achieved in both directions, at overlapping or non-overlapping time slots, using separate frequency communication bands between the first and second transceivers. Further schemes that are hybrid TDD/FDD schemes may also be employed as can be understood by a person skilled in the art(s).

Cooperative Beamforming: Providing "Matched" Beamforming Weights at Transmitter and Receiver A method for achieving cooperative transmit and receive beamforming over a MIMO communication channel is now provided according to an embodiment of the present invention.

Figure 4:
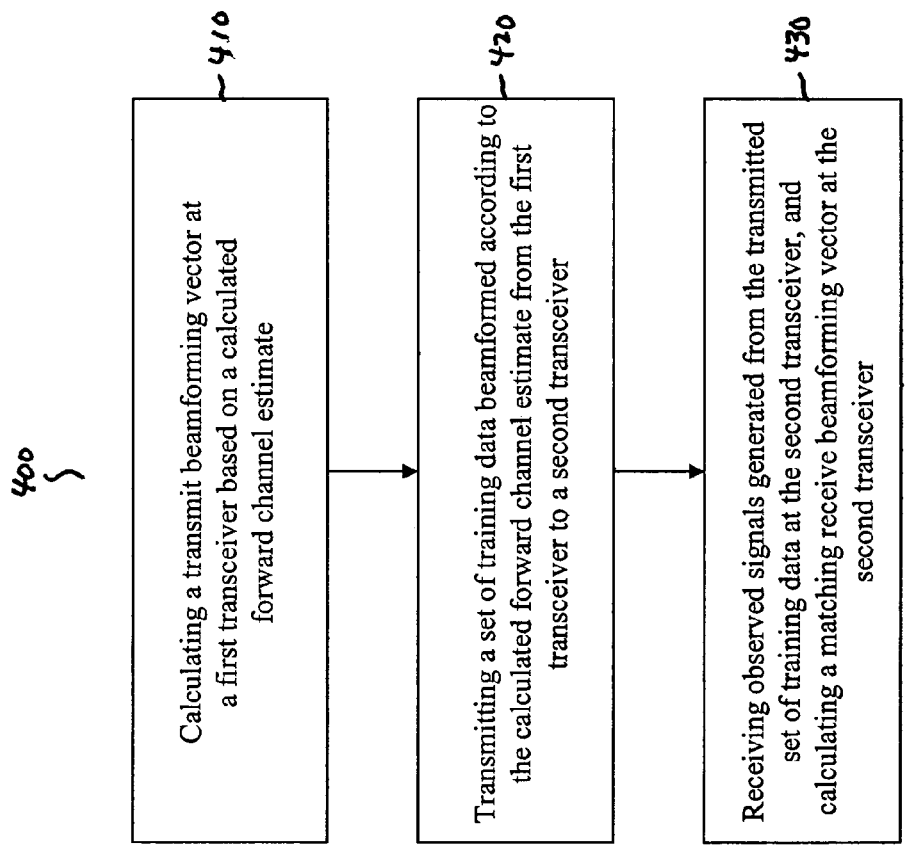
FIG. 4 is a process flowchart for cooperative transmit and receive beamforming according to an embodiment of the present invention.

FIG. 4 is a process flowchart 400 for achieving transmit and receive beamforming over a MIMO communication channel according an embodiment of the present invention. In the embodiment of FIG. 4, the MIMO communication channel includes one or more sub-channels between at least a first transceiver and at least a second transceiver. In an embodiment, the first transceiver includes a plurality of transmit antennas, and the second transceiver includes a plurality of receive antennas.

Process flowchart 400 begins in step 410, which includes calculating a transmit beamforming vector or matrix at the first transceiver based on a calculated forward channel estimate. In an embodiment, the transmit beamforming vector or matrix defines a transmit weight for each transmit antenna of the first transceiver. Typically, the transmit weight is a complex gain value representative of amplitude and phase factors applied to signals transmitted from that transmit antenna.

Step 420 includes transmitting a set of training data beamformed according to the calculated forward channel estimate from the first transceiver to the second transceiver. In an embodiment, the beamformed set of training is generated by applying the calculated transmit weight vector or matrix at the plurality of transmitters of the first transceiver.

Step 430 includes receiving, at the second transceiver, observed signals from the transmitted set of training data, and calculating a matching receive beamforming vector or matrix at the second transceiver. In an embodiment, the receive beamforming vector or matrix defines a receive weight for each receive antenna of the second transceiver. Typically, the receive weight is a complex gain value representative of amplitude and phase factors applied to signals received at that receive antenna. In an embodiment, the receive beamforming vector or matrix is matched to the transmit beamforming vector or matrix calculated in step 410. In another embodiment, the second transceiver may calculate a receive beamforming vector or matrix based on a reverse link channel estimate without matching the vector or matrix to the transmit beamforming vector or matrix.

In full-duplex channel estimation, the second transceiver may also calculate an optimal transmit beamforming vector or matrix for transmission to the first transceiver based on a calculated outgoing channel estimate. Correspondingly, the first transceiver calculates a matching receive beamforming vector or matrix based on a received set of training data sent by the second transceiver and beamformed according to the transmit beamforming vector or matrix.

Transmit and receive beamforming vectors or matrices according to embodiments of the present invention may be determined using various beamforming techniques. In an embodiment, transmit and receive beamforming vectors represent matched pairs of maximum ratio transmission/maximum ratio combining (MRT/MRC) weight vectors or modal decomposition matrices. In other embodiments, beamforming techniques such as selection diversity transmission (SDT), equal gain transmission (EGT), and zero SIR (Signal to Interference Ratio) forcing techniques may also be used.

Methods for calculating transmit beamforming vectors or matrices according to embodiments of the present invention will now be provided.

Figure 5:
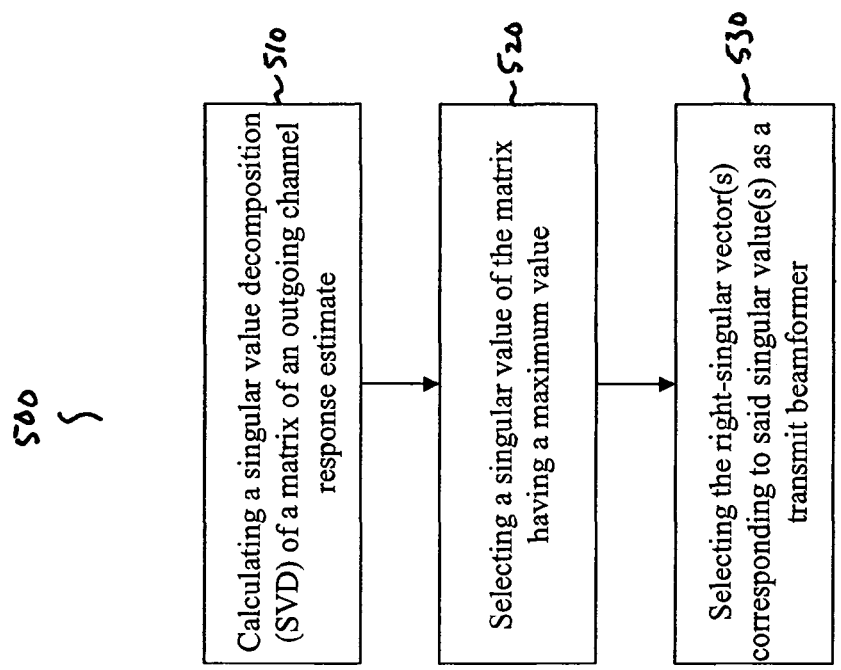
FIG. 5 is a process flowchart for determining transmit beamforming vectors or matrices according to an embodiment of the present invention.

FIG. 5 is a process flowchart 500 for determining transmit beamforming vectors or matrices according to an embodiment of the present invention. Steps of process flowchart 500 are performed, after channel estimation, by a first transceiver having a forward link communication channel to a second transceiver.

Process flowchart 500 begins in step 510, which includes calculating a singular value decomposition (SVD) of a matrix of the forward link channel estimate. Channel estimate matrices are of the form given in equation (1), for example, for the case of frequency-flat fading channels.

Step 520 includes selecting a singular value of the matrix having a maximum value.

Step 530 includes selecting the right-singular vector(s) corresponding to the selected singular value(s) as a transmit beamformer.

Embodiments of process flowchart 500 are typically implemented in flat fading channel conditions. Accordingly, the process depicted in the flowchart 500 is repeated at a frequency related to an estimated coherence time of the communication channel.

Figure 6:
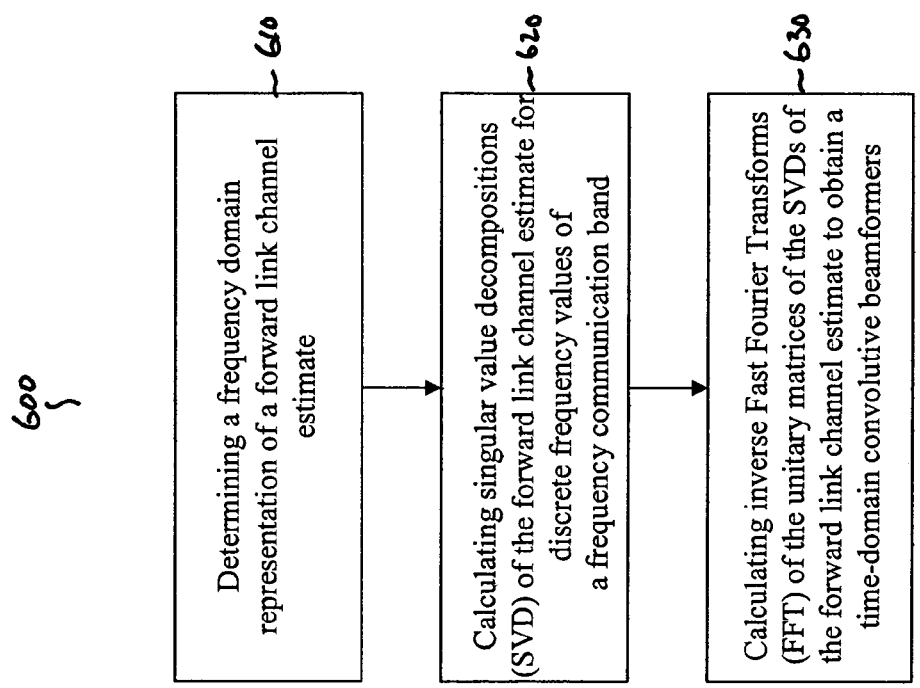
FIG. 6 is a process flowchart for determining transmit beamforming vectors or matrices for frequency selective channels according to an embodiment of the present invention.

FIG. 6 is another process flowchart 600 for determining transmit beamforming vector(s) according to an embodiment of the present invention. Steps of process flowchart 600 are performed, after channel estimation by a first transceiver having an estimate of the forward link communication channel to a second transceiver.

Process flowchart 600 begins in step 610, which includes determining a frequency domain representation of the forward link channel estimate.

Step 620 includes calculating singular value decompositions (SVDs) of the outgoing channel estimate for discrete frequency values of a frequency communication band.

Step 630 includes calculating inverse Fast Fourier Transforms (FFT) of the unitary matrices of the SVDs calculated in step 620 to obtain a time-domain convolutive beamformers.

Embodiments of process flowchart 600 are typically implemented in frequency-selective channel conditions.

Methods for matching receive beamforming vectors or matrices to transmit beamforming vectors or matrices are also provided according to embodiments of the present invention. In an example embodiment, a receive beamforming vector $u_B$ at a second transceiver B is matched to a transmit beamforming vector $u_A$ of a first transceiver A such that a maximum receive gain is achieved at B given channel conditions. In embodiments, the receive and transmit beamforming vectors satisfy the following condition:

$$u_B = H_{AB} u_A \qquad (2)$$

where $H_{AB}$ represents the forward link channel estimate at B of the communication channel from A to B. Typically, the maximum receive gain is equal to the maximum singular value of $H_{AB}$. $u_A$ and $u_B$ are given by the right and left singular vectors of $H_{AB}$ corresponding to the maximum singular value.

Figure 2D:
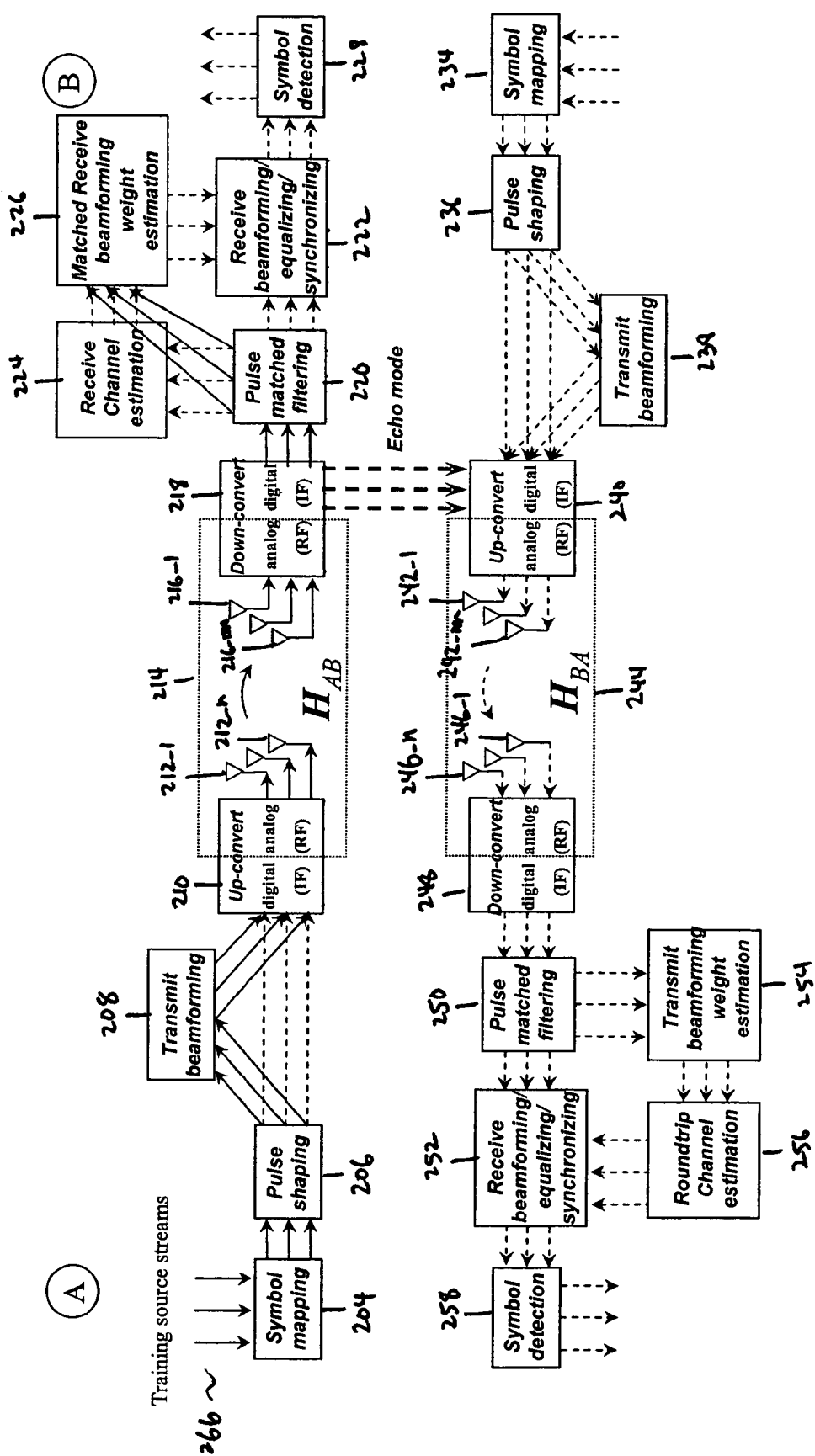
FIG. 2D is a block diagram that illustrates an implementation of a step of a MIMO channel estimation method according to an embodiment of the present invention.

FIG. 2D is a block diagram that illustrates steps 410, 420, and 430 of the process flowchart of FIG. 4 implemented in the MIMO communication system 200 of FIG. 2A.

Step 410 is achieved, in the example of FIG. 2D, by transmit beamforming component 208 calculating a transmit beamforming vector based on a calculated forward link channel estimate of communication channel $H_{AB}$ 214.

Step 420 is achieved, in the example of FIG. 2D, by training source streams 266 being symbol mapped, pulse shaped, and beamformed according to the calculated transmit beamforming vector, before being up-converted and transmitted by transmit antennas 212-{1, . . . , n} of transceiver A over communication channel $H_{AB}$ 214.

Step 430 is achieved, in the example of FIG. 2D, by transceiver B receiving the transmitted signals using receive antennas 216-{1, . . . , m}, down-converting, pulse match filtering the received signals, and calculating (using matched receive beamforming weight estimation component 226) a matching receive beamforming vector to the transmit beamforming vector calculated at A.

Example Illustration

Figure 7:
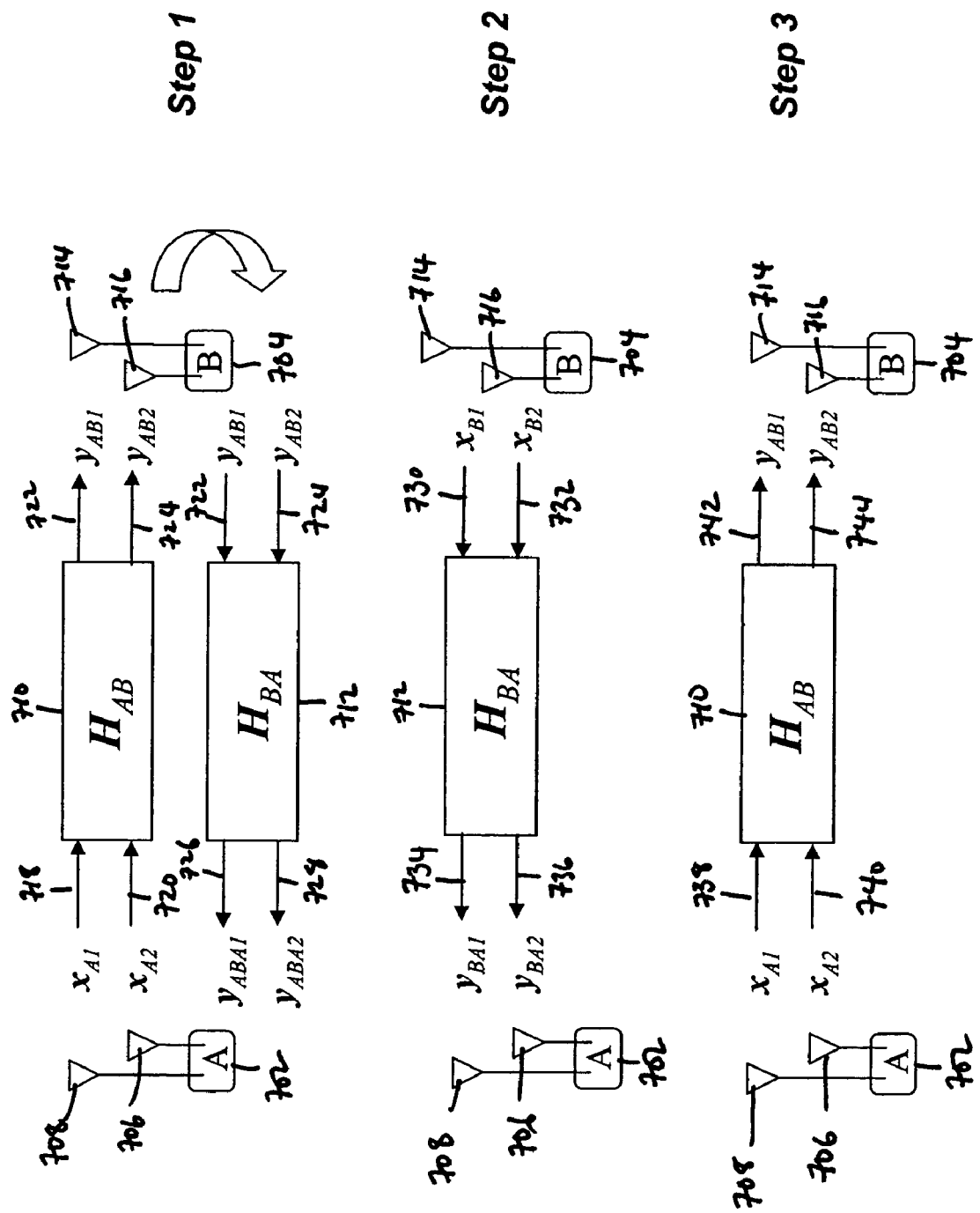
FIG. 7 is a high-level example illustration of a MIMO communication system implementing three-step channel estimation according to an embodiment of the present invention.

FIG. 7 is an example diagram that further illustrates the process of MIMO channel estimation as depicted in the process flowchart of FIG. 3 and cooperative beamforming as depicted in the process flowchart of FIG. 4. The example of FIG. 7 includes three steps 1, 2, and 3. The MIMO system depicted in the example of FIG. 7 includes a first communication system A 702 and a second communication system B 704. The first communication system 702 includes first and second antenna 706 and 708. The second communication system 704 also includes third and fourth antennas 714 and 716. The communication channel 710 from A to B is referred to, in terms of its channel estimate, as $H_{AB}$. Similarly, the communication channel 712 from B to A is referred to, in terms of its channel estimate, as $H_{BA}$.

Step 1, in the example of FIG. 7, corresponds to steps 310, 320, and 330 of the process flowchart of FIG. 3. In step 1, system A 702 transmits a first set of training data to system B 704. In the example of FIG. 7, the first set of training data is illustrated as signals $x_{A1}$ 718 and $x_{A2}$ 720 transmitted by the first and second antennas 706 and 708, respectively. Note that signals $x_{A1}$ 718 and $x_{A2}$ 720 are independent sequences. Signals $x_{A1}$ 718 and $x_{A2}$ 720 typically encounter different channel conditions in transmission over communication channel $H_{AB}$ 710.

Still in step 1, system B 704 receives observed signals from the first set of training data as signals $y_{AB1}$ 722 and $y_{AB2}$ 724, received by antennas 714 and 716 of B, respectively. Note that each of signals $y_{AB1}$ 722 and $y_{AB2}$ 724 is a weighted sum of transmitted signals $x_{A1}$ 718 and $x_{A2}$ 720 in the presence of additive white Gaussian noise, where the weights are complex gain factors representative of channel conditions as illustrated in equation (1), for example. B then re-transmits back to A observed signals $y_{AB1}$ 722 and $y_{AB2}$ 724, transmitted by antennas 714 and 716 of B, respectively.

Still in step 1, A receives the observed signals as signals $y_{ABA1}$ 726 and $y_{ABA2}$ 728, received by the first and second antennas of A, respectively. Based on received signals $y_{ABA1}$ 726 and $y_{ABA2}$ 728, A calculates an estimate $H_{ABA}$ of the roundtrip communication channel (A->B->A).

Step 2, in the example of FIG. 7, corresponds to steps 340, 350, and 360 of the process flowchart of FIG. 3. In step 2, system B 704 transmits a second set of training data to system A 702. The second set of training data may or may not be identical to the first set of training data used in step 1. In the example of FIG. 4, the second set of training data is illustrated as signals $x_{B1}$ 730 and $x_{B2}$ 732, transmitted by antennas 714 and 716 of B. Signals $x_{B1}$ 730 and $x_{B2}$ 732 are independent sequences. Signals $x_{B1}$ 730 and $x_{B2}$ 732 typically encounter different channel conditions in transmission over communication channel $H_{BA}$ 712.

Still in step 2, A receives observed signals from the second set of training data as received signals $y_{BA1}$ 734 and $y_{BA2}$ 736, received by the first and second antennas 706 and 708 of A, respectively. Based on received signals $y_{BA1}$ 734 and $y_{BA2}$ 736, A calculates an estimate $H_{BA}$ of the reverse link channel (B->A).

Still in step 2, having an estimate of its roundtrip channel (A->B->A) and an estimate of the reverse link channel (B->A), A calculates an estimate $H_{AB}$ of its outgoing channel (A->B). In an embodiment, $H_{AB}$ is calculated by finding a solution that results in a least-square error for the equation $H_{BA} \cdot H_{AB} = H_{ABA}$.

Step 3, in the example of FIG. 7, corresponds to steps 410, 420, and 430 of the process flowchart of FIG. 4. In step 3, system A 702 calculates a transmit beamforming vector based on the estimate $H_{AB}$ of the forward link channel. System A 702 then transmits a third set of training data, beamformed according to the calculated transmit beamforming vector, to B 704. In the example of FIG. 7, the third set of training data is illustrated as signals $x_{A1}$ 738 and $x_{A2}$ 740 transmitted by the first and second antennas 706 and 708 of A, respectively. Signals $x_{A1}$ 738 and $x_{A2}$ 740 may or may not be duplicates of each other depending on the rank of the beamformer (i.e. rank-1 beamforming equals MRT/MRC, full rank beamforming equals modal decomposition).

Still in step 3, system B 704 receives the transmitted third set of training data as signals $y_{AB1}$ 742 and $y_{AB2}$ 744, received by the third and fourth antennas 714 and 716 of B, respectively. Note that in step 1, system B 704 may calculate an estimate of its incoming channel (A->B) based on the first set of training data. Accordingly, based on that and on received signals $y_{AB1}$ 742 and $y_{AB2}$ 744, system B 704 can calculate a receive beamforming vector matched to the transmit beamforming vector calculated at A 702.

Quasi-Symmetric Echo MIMO Channel Estimation

A quasi-symmetric communication channel, including a forward and a reverse channel, is one that is characterized by symmetric properties that relate channel conditions of its forward and reverse channels. In an embodiment, channel estimates of the forward and reverse channels may be substantially similar or have sufficient similarity to deduce one from the other. This is known as channel reciprocity exploitation. A method for channel estimation for quasi-symmetric communication channels according to an embodiment of the present invention is now provided.

Figure 8:
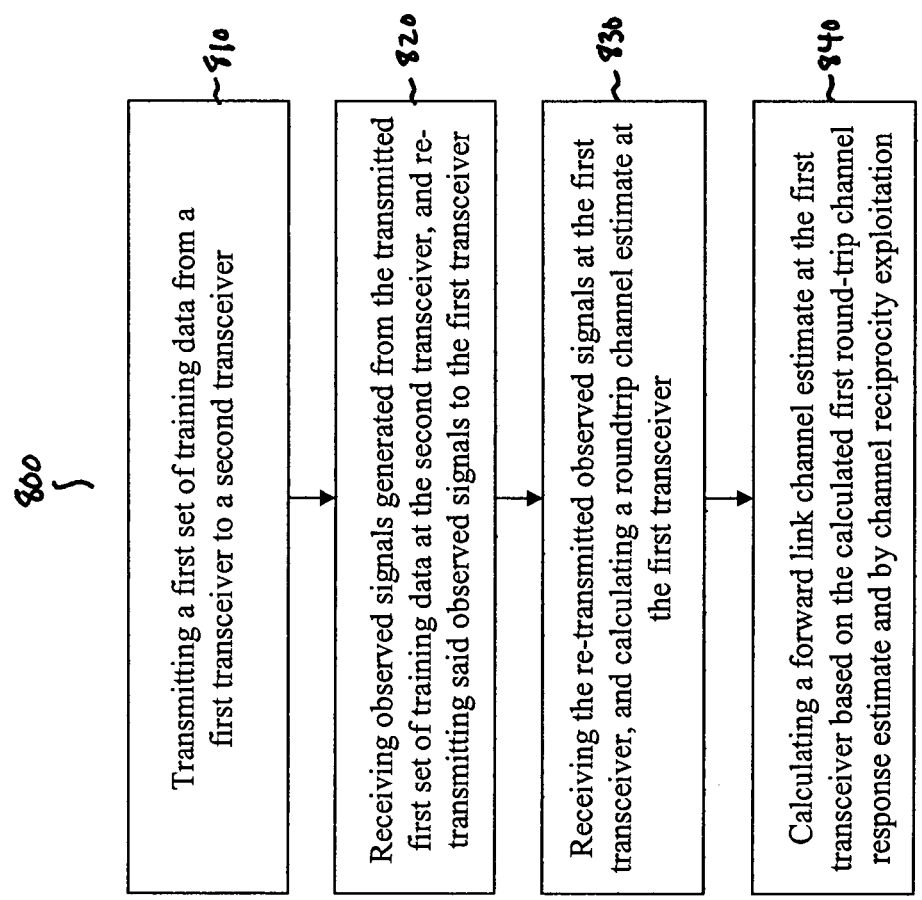
FIG. 8 is a process flowchart for channel estimation in quasi-symmetric communication channels according to an embodiment of the present invention.

FIG. 8 is a process flowchart 800 for estimating a quasi-symmetric communication channel according to an embodiment of the present invention. In the embodiment, the communication channel includes one or more sub-channels between at least a first transceiver and at least a second transceiver.

Process flowchart 800 begins in step 810, which includes transmitting a first set of training data from the first transceiver to the second transceiver. The training data is known at both transceivers.

Step 820 includes receiving observed signals from the first set of training data at the second transceiver, and re-transmitting the observed signals to the first transceiver.

Step 830 includes receiving the re-transmitted observed signals at the first transceiver, and calculating a roundtrip channel estimate at the first transceiver. Steps 810, 820 and 830 correspond, for example, to the "Echo" step 1 of the example of FIG. 4.

Step 840 includes calculating a forward link channel estimate at the first transceiver based on the calculated roundtrip channel estimate and by exploiting the quasi-symmetry (quasi-reciprocity) of the round trip communication channel. Note that channel estimation in a quasi-symmetric communication channel can be achieved in a single "Echo" step (step 1 in the example of FIG. 4) and using a single set of training data. Further, transmit and receive beamforming can also, subsequent to channel estimation, be achieved in quasi-symmetric communication channels using substantially similar techniques as described above.

Echoing Approaches

Figure 9:
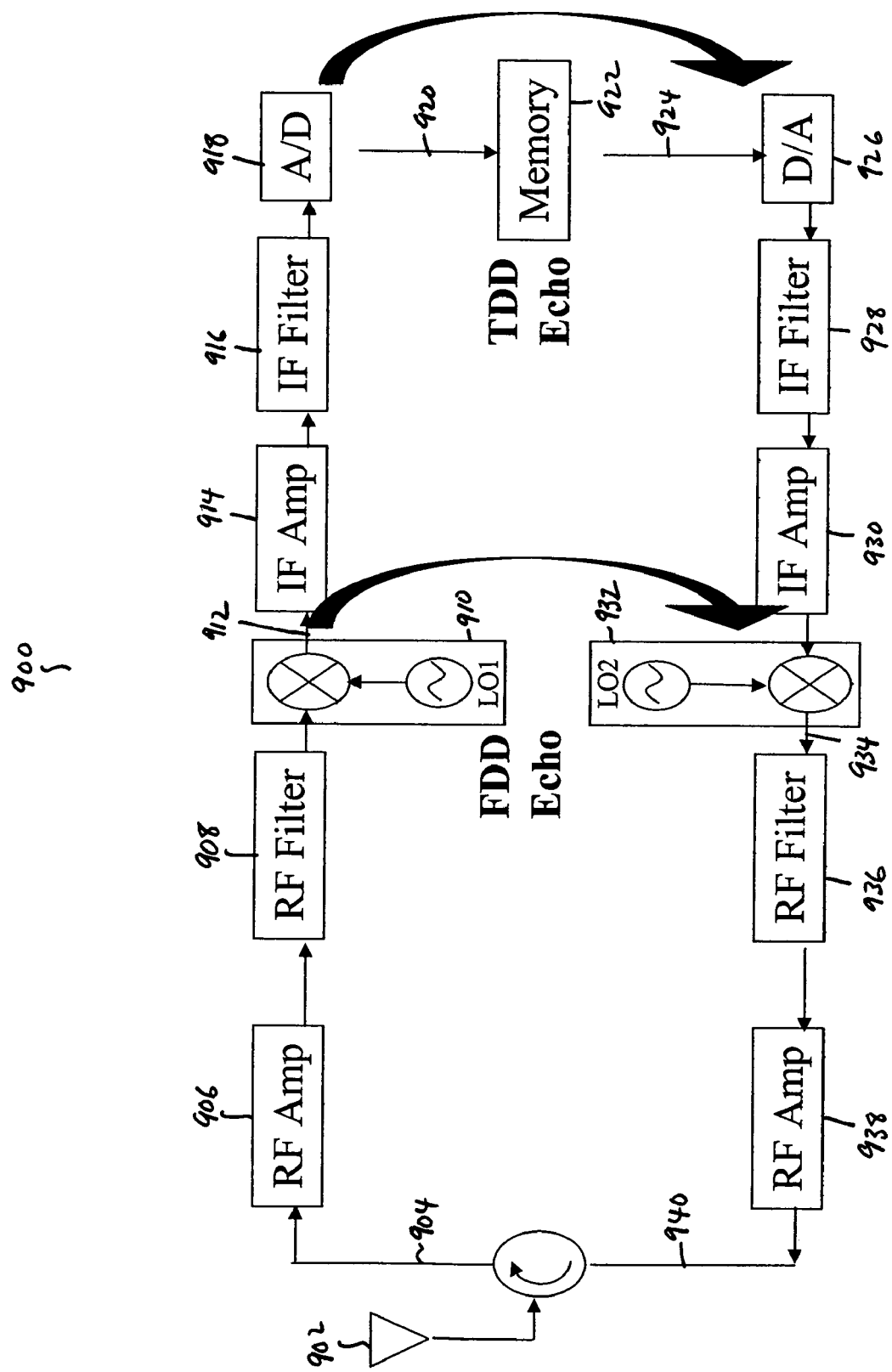
FIG. 9 is a block diagram that illustrates different approaches for implementing a repeater (commonly known as "amplify-and-forward" and "decode-and-forward") to echo training signals according to an embodiment of the present invention.

As described above, Echo channel estimation may be achieved using time-division-duplexing (TDD) or frequency-division-duplexing (FDD) schemes. Depending on the type of scheme employed, however, the "echo" step may be performed differently within the transceiver performing the step. FIG. 9 is a block diagram that illustrates different approaches for performing the "echo" step within an exemplary transceiver 900 according to an embodiment of the present invention.

In FIG. 9, exemplary transceiver 900 includes a transmit chain, a receive chain, a transmit/receive antenna 902, and a memory 922. The receive chain of transceiver 900 includes a RF amplifier 906, a RF filter 908, a modulator 910, an IF amplifier 914, an IF filter 916, and an analog-to-digital (A/D) converter 918. The transmit chain of transceiver 900 includes a digital-to-analog (D/A) converter 926, an IF filter 928, an IF amplifier 930, a modulator 932, a RF filter 936, and a RF amplifier 938.

According to an FDD channel estimation embodiment of the present invention, the "echo" step is performed at IF. Accordingly, as shown in the example of FIG. 9, a received RF signal 904 is down-converted to IF (after amplification and filtering) and then directly fed from the output of receive IF down-converter 910 to the input of transmit RF upconverter 932. Noise accumulation in the transceiver can thereby be avoided.

According to a TDD channel estimation embodiment of the present invention, the "echo" step is performed in the digital portion of the transceiver. As shown in the example of FIG. 9, received RF signal 904 is first RF amplified, filtered, and down-converted to IF frequency to generate signal 912.

Signal 912, in turn, is IF amplified, filtered, and converted to digital signal 920. The "echo" step is performed by storing digital signal 920 in memory 922, and then feeding it as digital signal 924 to the transmit chain. In the transmit chain, digital signal 924 is converted to analog, IF filtered, amplified, and up-converted to RF frequency to generate RF signal 934. RF signal 934 is then RF filtered and amplified to generate signal 940, which is transmitted by antenna 902. Note that RF signal 934 is up-converted to an identical RF frequency as that of received RF signal 904.

Method of Estimation Based on Received Pulse Samples

Figure 10:
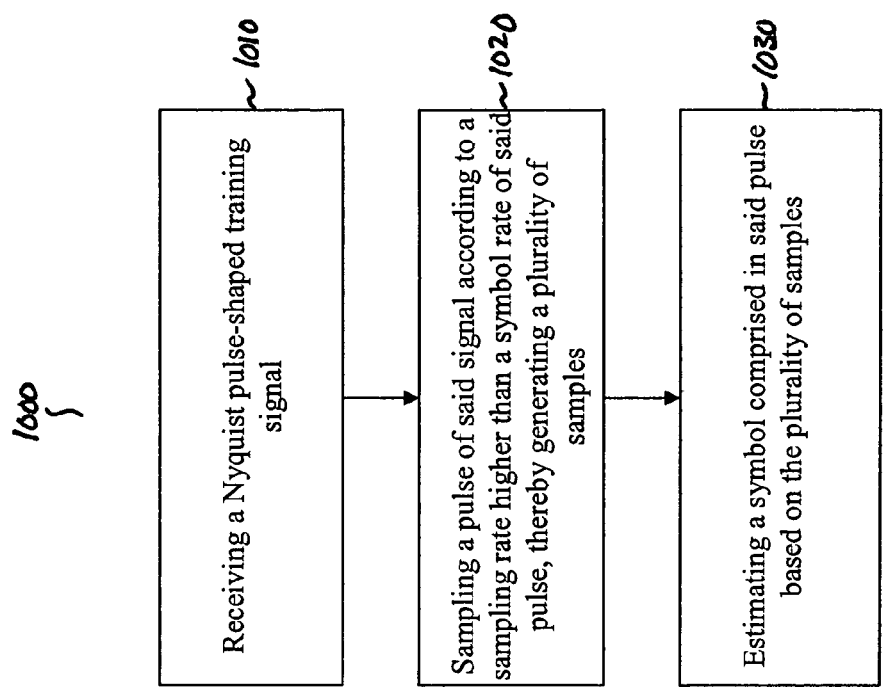
FIG. 10 is a process flowchart for oversampled symbol detection according to an embodiment of the present invention.

In another aspect of the present invention, a method of channel estimation that results in a reduced effect of symbol timing synchronization errors is provided. FIG. 10 is a process flowchart 1000 for channel estimation according to an embodiment of said method. Process flowchart 1000 begins in step 1010, which includes receiving a Nyquist pulse-shaped training signal. In an embodiment, the training signal is pulse-shaped using a raised-cosine pulse shaping filter.

Step 1020 includes sampling a pulse of the received signal according to a sampling rate higher than a symbol rate of the pulse. In an embodiment, the pulse is sampled at the highest rate possible of an A/D converter that is sampling the pulse. A plurality of samples are generated at the end of step 1020.

Step 1030 includes estimating a symbol comprised in the pulse based on the plurality of samples. Clearly, by having a plurality of samples, a better determination can be made of the symbol comprised in the pulse. Accordingly, symbol timing synchronization errors will have a significantly lower effect on symbol detection. This, in turn, results in an improved estimation of the channel as symbol detection errors within the transceiver are removed.

Mathematical Description of ECHO MIMO Channel Estimation

In this section, a mathematical description of ECHO MIMO channel estimation is provided. As understood by a person skilled in the relevant art(s), embodiments of ECHO MIMO channel estimation are not limited to the mathematical description provided herein, and may be implemented using equivalent or substantially equivalent mathematical formulations.

For ease of reference, the mathematical description will be provided with reference to the ECHO MIMO steps depicted in FIG. 7.

In step 1, transceiver A 702 initiates a roundtrip training signal to transceiver B 704. A transmits a training set $x_A$ and B receives a snapshot sample matrix $Y_{AB}$. $Y_{AB}$ is given by:

$$Y_{AB} = H_{AB} X_A + W_B. \quad (3)$$

where $H_{AB}$ represents the channel impulse response of the channel from A to B, and $W_B$ represents a matrix of additive noise.

B echoes the received snapshot sample matrix (without root raised cosine matched-filtering) exactly as received back to A. A receives back the snapshot matrix, which can be written as:

$$Y_{ABA} = (H_{BA} R_{AB} + W'_A) G \quad (4)$$
$$= (H_{BA} H_{AB} X_A^{rc}) + (H_{BA} W_B + W'_A) G.$$

where $H_{BA}$ represents the channel impulse response of the channel from B to A, $R_{AB} = H_{AB} X_A + W_B$, $X_A^{rc} = X_A G$ is a pulse-shaped and matched filtered complex-valued version of training set $X_A$, and G is a Toeplitz convolution matrix for the pulse-shaping filter. G is typically given by:

$$G = [g[i-j]] = \begin{bmatrix} g[0] & \cdots & 0 \\ \vdots & \ddots & \vdots \\ g[L-1] & & g[0] \\ \vdots & \ddots & \vdots \\ 0 & \cdots & g[L-1] \end{bmatrix} \quad (5)$$

Note that in equation (4), the roundtrip noise has two terms. B echoes it own thermal noise as part of its received signal, then A adds its own thermal noise $W'_A$ as it receives the echo. This equation can also be put into matrix-vector form in two ways, depending on which channel matrix is chosen to be vectorized:

$$y_{ABA} = (X_A^{rcT} H_{AB}^T \otimes I_{MA}) h_{BA} + (G^T \otimes H_{BA}) w_B + (G^T \otimes I_{MA}) w'_A \quad (6)$$

$$y_{ABA} = (X_A^{rcT} \otimes H_{BA}) h_{AB} + (G^T \otimes H_{BA}) w_B + (G^T \otimes I_{MA}) w'_A. \quad (7)$$

where the roundtrip noise vector $w_{BA} = (G^T \otimes H_{BA}) w_B + (G^T \otimes I_{MA}) w'_A$ has a covariance matrix $V_{w_{BA}} = G^T G \otimes (\sigma_A^2 I_{M_A} + \sigma_B^2 H_{BA} H_{BA}^H)$, and where $M_A$ represents the number of antenna elements at transceiver A.

In step 2, transceiver B 704 sends its own training set $X_B$ to transceiver A 702. Transceiver A receives a snapshot matrix $Y_{BA}$, given by:

$$Y_{BA} = H_{BA} X_B^{rc} + W_A G \quad (8)$$

Similarly, equation (8) can be written into matrix-vector form as follows:

$$y_{BA} = (X_B^{rcT} \otimes I_{MA}) h_{BA} + (G^T \otimes I_{MA}) w_A, \quad (9)$$

where the matched-filtered noise $w_A$ has a covariance matrix $$V_{w_A} = (G^T \otimes I_{MA}) E(w_A w_A^H)(G \otimes I_{MA}) \quad (10)$$
$$= (G^T G \otimes \sigma_A^2 I_{MA}).$$

At this point, transceiver A has collected two sets of snapshots $Y_{BA}$ and $Y_{ABA}$. A can calculate an estimate of its forward channel $H_{AB}$. It is clear from equation (4) that A must estimate both channel matrices $H_{AB}$ and $H_{BA}$ together. The linear models for $y_{ABA}$ in equations (6) and (7) suggest that estimates $\hat{h}_{AB}$ and $\hat{h}_{BA}$ of $H_{AB}$ and $H_{BA}$ should jointly minimize the weighted squared error, given by:

$$\Sigma^2 = \min \left( \left\| V_A \otimes W_A \right)^{\frac{1}{2}} \cdot [y_{BA} - (X_B^{rcT} \otimes I_{MA}) h_{BA}] \right\|_2^2 h_{AB}, \quad (11)$$
$$h_{BA} + \left\| (V_{BA} \otimes W_{BA})^{\frac{1}{2}} \cdot [y_{ABA} - (X_A^{rcT} H_{AB}^T \otimes I_{MA}) h_{BA}] \right\|_2^2 \right)$$

$$= \min \left( \left\| V_A \otimes W_A \right)^{\frac{1}{2}} \cdot [y_{BA} - (X_B^{rcT} \otimes I_{MA}) h_{BA}] \right\|_2^2 h_{AB}, \quad (12)$$
$$h_{BA} + \left\| (V_{BA} \otimes W_{BA})^{\frac{1}{2}} \cdot [y_{ABA} - (X_A^{rcT} \otimes H_{BA}) h_{AB}] \right\|_2^2 \right).$$

where $\|.\|_2$ denotes the usual 2-norm of a vector. Error equation (12) is based on the model given by (7). The two squared error terms are separate since the noise vectors in their respective linear models are statistically independent.

To minimize (11), its gradients are calculated with respect to the real and imaginary parts of $\hat{h}_{AB}$ and $\hat{h}_{BA}$, respectively, and are set equal to zero. Through mathematical manipulation, this yields:

$$I_{M_B} = (H_{BA})_{W_A^+} Y_{BA} (X_B^{rc})_{V_A^+} \tag{13}$$

$$H_{AB} = (H_{BA})_{W_{BA}^+} Y_{ABA} (X_A^{rc})_{V_{BA}^+} \tag{14}$$

where $Z_{W^+}$ denotes the Moore-Penrose pseudoinverse of a complex matrix Z with weight matrix W, computed in general from the singular value decomposition (SVD) of Z, or by $Z_W^+ = (Z^H W Z)^{-1} Z^H W$ (left pseudoinverse) when Z has full column rank. Equation (13) has the linear solution for transceiver A given by:

$$\hat{H}_{BA}^{(A)} = Y_{BA} (X_B^{rc})_{V_A^+} \tag{15}$$

Equation (15) provides transceiver A with the optimum estimate of $H_{AB}$.

So far the weight matrices have not been determined. For linear least squares problems it is well-known that minimum variance estimates result by choosing the inverse covariance matrix of the noise as the weight matrix. The joint least squares problem as provided in equation (11) is only half linear, or conditionally linear, but does admit a linear estimate $\hat{H}_{BA}^{(A)}$ as given by equation (15). Thus it is plausible that minimum variance estimates can be obtained based on the weights given by the inverse covariance matrices:

$$V_A = V_{BA} = (G^T G)^{-1} \tag{16}$$

$$W_{BA} = (\sigma_A^2 I_{MA} + \sigma_B^2 H_{BA} H_{BA}^H)^{-1}$$

Note that in the case that $H_{BA}$ is square ($M_A = M_B$) and non-singular, $(H_{BA})_{W_{BA}^+} = H_{BA}^{-1}$ and the weights $W_{BA}$ do not affect the estimate given by (15). Otherwise, this weight matrix is first estimated by the formula:

$$\tilde{W}_{BA} = \left(\frac{1}{N} N_{BA} N_{BA}^H\right)^{-1} \tag{17}$$

from the roundtrip regression residuals based on model equation (4), $$N_{BA} = Y_{ABA} - \hat{Y}_{ABA} \tag{18}$$
$$= Y_{ABA} - Y_{ABA}(X_A^{rc})_{V_A}^+ X_A^{rc}$$
$$= Y_{ABA} P_A^\perp.$$

where $P_A^\perp = I - (X_A^{rc})_{V_A^+} X_A^{rc}$ is the orthogonal projector off of (as opposed to onto) the span of the rows of $X_A^{rc}$. The training matrix $X_A^{rc}$ is designed to have full row rank. Note that the solutions for channel estimates at transceiver B are equivalent to the ones described herein with the roles of A and B exchanged.

Having estimated its forward channel matrix using the ECHO MIMO technique as described above, transceiver A is ready for optimum information transmission to transceiver B. Typically, there are various ways to configure an informed MIMO transmitter and informed receiver. In an embodiment, which is described below, a Maximum Ratio Transmission and Combining (MRT/MRC) technique can be used. The technique employs rank-1 cooperative beamforming to produce maximum gain over the channel, for constant total transmitted power departing from transceiver A.

Given that the MRT and MRC beamformers to transmit and receive are denoted as $v_A$ and $u_B$, respectively, using a generalization of the Rayleigh maximum principle that transceiver B's maximum received gain $\gamma = u_B^H H_{AB} v_A$ equals the largest singular value $\sigma_{AB}^{(1)}$ of the channel matrix $H_{AB}$, this gain is achieved for weight vectors $v_A^{(1)}$ and $u_B^{(1)}$ given by the corresponding right and left singular vectors of $H_{AB}$. In practice, the beamforming weight vectors $\hat{v}_A$ and $\hat{u}_B$ are unavoidably approximations of the optimum $v_A^{(1)}$ and $\hat{u}_B$. However, for a given suboptimum unit transmit beamforming vector $\hat{v}_A$, the Schwarz inequality implies that the highest gain $\gamma$ is achieved for the unit receive beamforming vector:

$$\hat{u}_B = H_{AB} \hat{v}_A. \tag{19}$$

A pair of beamformers that obey equation (19) are said to be matched with respect to the channel.

In step 3 of ECHO MIMO channel estimation, transceiver A 702 transmits beamformed training data through the channel to transceiver B 704. From equation (19), it can be seen that transceiver B receives noisy snapshots of its matching receive weights, from which it can readily estimate them. Step 3 is now described with more detail.

To transmit information to transceiver B, transceiver A computes the singular vector $\hat{v}_A$ with maximum singular value from its forward channel matrix estimate $\hat{H}_{AB}$. This vector represents the maximum ratio transmit beamformer of A. To enable transceiver B to recover its receive beamforming vector that matches A's transmit beamforming vector, transceiver A now transmits a third training set, a sampled and pulse-shaped training stream $\tilde{x}^O[n]$, sent from every antenna (multiplied by the beamforming weight for the antenna) of A. Accordingly, the beamformed output sent from A's array is given by:

$$x_A^O[n] = \hat{v}_A \tilde{x}^O[n] \tag{20}$$

for $n = 1, \ldots, N_{train}$.

Transceiver B receives A's transmitted signal via the channel as $N_{train}$ snapshots (after synchronized sampling and pulse-matched filtering) given by:

$$y_{AB}^O = H_{AB} x_A^O[n] + w_{rrc}^O[n] \tag{21}$$
$$= H_{AB} \hat{v}_A \tilde{x}_{rc}^O[n] + w_{rrc}^O[n]$$
$$= \hat{u}_B \tilde{x}_{rc}^O[n] + w_{rrc}^O[n]$$

by equation (19) for beamformer pairs matched with respect to the channel.

Transceiver B now estimates its matched MRC weights by least squares using $\tilde{w}^O = V_A \tilde{x}_{rc}^O$, as:

$$\hat{u} = Y^O (\tilde{x}_{rc}^O)_{V_A}^+ = \frac{1}{\tilde{x}_{rc}^{O H} \tilde{w}^O} \sum_{n=1}^{N_{train}} \tilde{w}^O[n] y^O[n,] \tag{22}$$

At this point, training is completed. Transceivers A and B possess a pair of matched beamformers and are ready to communicate information.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of estimating a communication channel comprising one or more sub-channels between at least a first transceiver and at least a second transceiver, the method comprising:
   (a) transmitting a first set of training data from the first transceiver to the second transceiver;
   (b) receiving first observed signals resulting from the transmitted first set of training data at the second transceiver, and re-transmitting said first observed signals to the first transceiver, wherein said first observed signals contain data representative of symbols contained in the first set of training data;
   (c) receiving the re-transmitted first observed signals at the first transceiver, and calculating a roundtrip channel estimate at the first transceiver;
   (d) transmitting a second set of training data from the second transceiver to the first transceiver;
   (e) receiving second observed signals from the transmitted second set of training data at the first transceiver, and calculating a reverse channel estimate at the first transceiver based on the received second observed signals; and
   (f) calculating a forward channel estimate at the first transceiver based on the calculated round-trip channel estimate and the calculated reverse channel estimate;
   wherein the round-trip channel estimate is representative of channel conditions of a round-trip communication channel including a forward communication channel from the first transceiver to the second transceiver and a reverse communication channel from the second transceiver to the first transceiver.

2. The method of claim 1, wherein the first transceiver comprises a first set of a plurality of transmit and receive antennas and wherein the second transceiver comprises a second set of a plurality of transmit and receive antennas.

3. The method of claim 2, wherein the forward channel estimate is optimized by having the roundtrip channel estimate and the reverse channel estimate jointly minimize a weighted least-square error.

4. The method of claim 2, wherein the first and second transceivers comprise electromagnetic transceivers.

5. The method of claim 2, wherein the first and second transceivers comprise acoustic transceivers.

6. The method of claim 1, further comprising:
   (g) calculating a reverse channel estimate at the second transceiver based on the received first observed signals.

7. The method of claim 2, further comprising:
   (g) calculating a transmit beamforming vector at the first transceiver based on the calculated forward channel estimate, wherein said transmit beamforming vector defines a transmit weight for each transmit antenna of the first transceiver.

8. The method of claim 7, wherein step (g) comprises:
   (i) calculating a singular value decomposition (SVD) of a matrix of the forward channel estimate;
   (ii) selecting the maximum singular value of the matrix; and
   (iii) selecting the right-singular vector corresponding to said maximum singular value as the transmit beamforming vector.

9. The method of claim 7, further comprising:
   (h) calculating a receive beamforming vector at the second transceiver based on the calculated reverse channel estimate at the second transceiver, wherein said receive beamforming vector defines receive weights for each receive antenna of the second transceiver.

10. The method of claim 7, wherein the communication channel is a frequency-selective channel, and wherein step (g) further comprises:
    (i) estimating a set of finite-impulse response (FIR) channel response coefficients for each subchannel of the communication channel;
    (ii) determining a frequency domain representation of the forward channel estimate;
    (iii) calculating singular value decompositions (SVDs) of the forward channel estimate for discrete frequency values of a frequency communication band; and
    (iv) calculating the inverse Fast Fourier Transforms (FFT) of the SVDs of the forward channel estimate to obtain a time-sequence of optimum transmit beamforming vectors.

11. The method of claim 7, further comprising:
    (h) transmitting a third set of training data beamformed according to the calculated transmit beamforming vector from the first transceiver to the second transceiver; and
    (i) receiving observed signals from the transmitted beamformed third set of training data, and calculating an optimum matching receive beamforming vector at the second transceiver.

12. The method of claim 6, wherein full duplex channel estimation is be achieved by repeating steps (a)-(c) starting from the second transceiver, and by calculating a forward channel estimate at the second transceiver based on a roundtrip channel estimate calculated at the second transceiver and the reverse channel estimate calculated at the second transceiver.

13. The method of claim 12, further comprising:
    (h) calculating a transmit beamforming vector based on the calculated forward channel estimate at the second transceiver; and
    (i) transmitting a fourth set of training data beamformed according to the calculated transmit beamforming vector from the second transceiver to the first transceiver; and
    (j) receiving observed signals from the transmitted fourth set of training data, and calculating an optimum matching receive beamforming vector at the first transceiver.

14. The method of claim 9, wherein the transmit and receive beamforming vectors represent matched pairs of maximum ratio transmission/maximum ratio combining (MRT/MRC) weight vectors.

15. The method of claim 12, wherein full-duplex channel estimation between the first and second transceivers is achieved according to a time-division-duplexing (TDD)

scheme using a single frequency band for communication between the first and second transceivers.

16. The method of claim 12, wherein full-duplex channel estimation between the first and second transceivers is achieved according to a frequency-division-duplexing (FDD) scheme using separate frequency bands for communication between the first and second transceivers.

17. A method for performing matched cooperative beamforming over a communication channel comprising one or more sub-channels between at least a first transceiver and at least a second transceiver, comprising:
   (a) transmitting a set of training data beamformed according to a transmit beamforming vector from a first transceiver to a second transceiver; and
   (b) receiving observed signals from the transmitted set of training data at said second transceiver, and calculating an optimum matching receive beamforming vector at the second transceiver;
   wherein the transmit beamforming vector is calculated according to a forward channel estimate, the forward channel estimate calculated at the first transceiver based on a round-trip channel estimate and a reverse channel estimate calculated at the first transceiver, and
   wherein the round-trip channel estimate is representative of channel conditions of a round-trip communication channel including a forward communication channel from the first transceiver to the second transceiver and a reverse communication channel from the second transceiver to the first transceiver.

18. The method of claim 17, wherein the communication channel is a frequency-selective channel, and wherein calculating the transmit beamforming vector further comprises:
   (i) estimating a set of finite-impulse response (FIR) channel response coefficients for each subchannel of the communication channel;
   (ii) determining a frequency domain representation of the forward channel estimate;
   (iii) calculating singular value decompositions (SVDs) of the forward channel estimate for discrete frequency values of a frequency communication band; and
   (iv) calculating the inverse Fast Fourier Transforms (FFT) of the SVDs of the forward channel estimate to obtain a time-sequence of optimum transmit beamforming vectors.

19. A method of estimating a quasi-symmetric communication channel comprising one or more sub-channels between at least a first transceiver and at least a second transceiver, the method comprising:
   (a) transmitting a first set of training data from the first transceiver to the second transceiver;
   (b) receiving observed signals resulting from the transmitted first set of training data at the second transceiver, and re-transmitting the observed signals back to the first transceiver, wherein the observed signal contain data representative of symbols contained in the first set of training data;
   (c) receiving the re-transmitted observed signals at the first transceiver, and calculating a roundtrip channel estimate at the first transceiver based on the re-transmitted observed signals; and
   (d) calculating a forward channel estimate at the first transceiver based on the calculated roundtrip channel estimate and by channel reciprocity exploitation;
   wherein the round-trip channel estimate is representative of channel conditions of a round-trip communication channel including a forward communication channel from the first transceiver to the second transceiver and a reverse communication channel from the second transceiver to the first transceiver.

20. The method of claim 19, wherein the first transceiver comprises a first set of a plurality of transmit and receive antennas and wherein the second transceiver comprises a second set of a plurality of transmit and receive antennas.

21. The method of claim 19, further comprising:
   (e) calculating a transmit beamforming vector according to the calculated forward channel estimate at the first transceiver.

22. The method of claim 21, further comprising:
   (f) transmitting a second set of training data beamformed according to the calculated transmit beamforming vector from the first transceiver to the second transceiver; and
   (g) receiving observed signals from the transmitted beamformed second set of training data at the second transceiver, and calculating a matching receive beamforming vector at the second transceiver, wherein said beamforming vector defines a receive weight for each receive antenna of the second transceiver.

23. A method of estimating a communication channel comprising one or more sub-channels between at least a first transceiver and at least a second transceiver, the method comprising:
   (a) transmitting a first set of training data from the first transceiver to the second transceiver;
   (b) receiving first signals at the first transceiver, wherein the first signals correspond to observed and re-transmitted signals by the second transceiver, wherein the observed signals result from receiving the first set of training data at the second transceiver and contain data representative of symbols contained in the first set of training data;
   (c) calculating a round-trip channel estimate at the first transceiver based on the first set of training data and the first signals;
   (d) receiving second signals at the first transceiver, wherein the second signals correspond to a second set of training data transmitted from the second transceiver to the first transceiver;
   (e) calculating a reverse channel estimate at the first transceiver based on the second set of training data and the second signals;
   (f) calculating a forward channel estimate at the first transceiver based on the calculated round-trip channel estimate and the calculated reverse channel estimate,
   wherein the round-trip channel estimate is representative of channel conditions of a round-trip communication channel including a forward communication channel from the first transceiver to the second transceiver and a reverse communication channel from the second transceiver to the first transceiver.

24. A method of estimating a quasi-symmetric communication channel comprising one or more sub-channels between at least a first transceiver and at least a second transceiver, the method comprising:
   (a) transmitting a first set of training data from the first transceiver to the second transceiver;
   (b) receiving first signals at the first transceiver, wherein the first signals correspond to observed and re-transmitted signals by the second transceiver, wherein the observed signals result from receiving the first set of training data at the second transceiver and contain data representative of symbols contained in the first set of training data;
   (c) calculating a round-trip channel estimate at the first transceiver based on the first set of training data and the first signals; and (d) calculating a forward channel estimate at the first transceiver based on the calculated roundtrip channel estimate and by channel reciprocity exploitation;

wherein the round-trip channel estimate is representative of channel conditions of a round-trip communication channel including a forward communication channel from the first transceiver to the second transceiver and a reverse communication channel from the second transceiver to the first transceiver.

\* \* \* \* \*